Aug. 9, 1932.  P. MEYER  1,871,381
ARTICLE EJECTOR MECHANISM
Filed Aug. 2, 1929
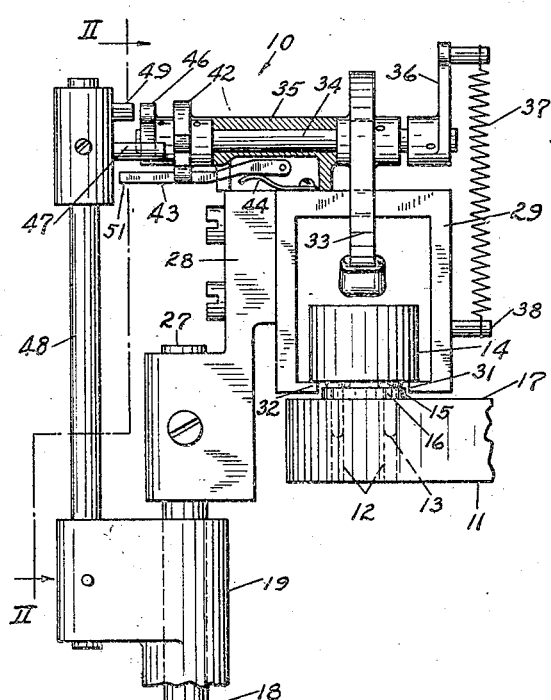
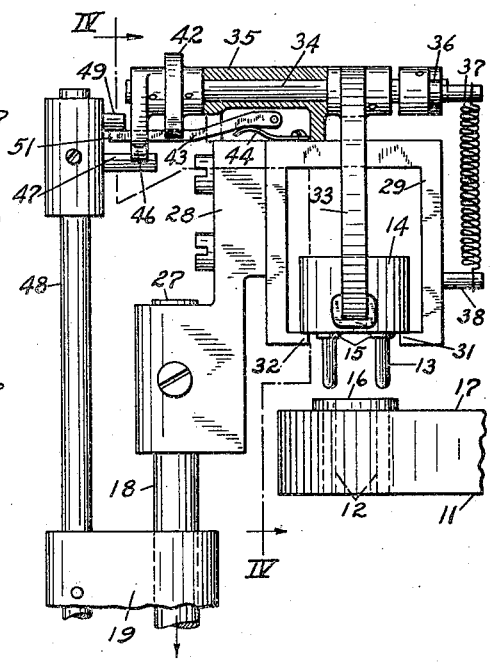
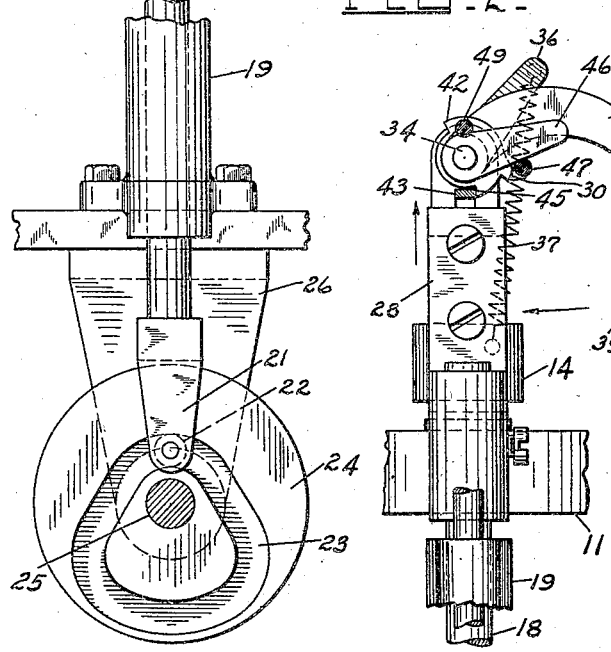
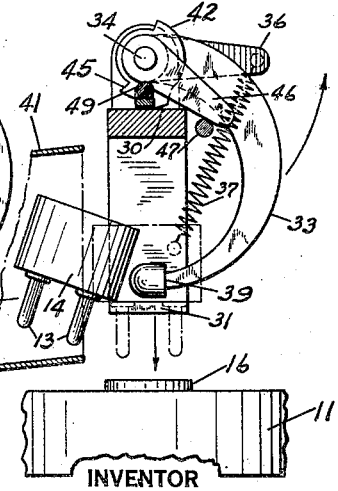
INVENTOR
P. MEYER
BY
ATTORNEY Patented Aug. 9, 1932

1,871,381

UNITED STATES PATENT OFFICE

PETER MEYER, OF NEWARK, NEW JERSEY, ASSIGNOR TO WESTINGHOUSE LAMP COMPANY, A CORPORATION OF PENNSYLVANIA

ARTICLE EJECTOR MECHANISM

Application filed August 2, 1929. Serial No. 383,125.

This invention relates to mechanism for discharging articles from a support and relates more particularly to a device for discharging bases for electrical devices from a conveyor.

In the manufacture of electrical devices such, for example, as radio tubes, it is necessary to provide a lamp base with a plurality of contact elements or pins. Usually the bases are composed of an insulative material, such as a condensite product and after the bases have been molded they are applied to a machine which automatically secures or stakes in the metallic contact pins, the pins being arranged to project perpendicularly from the bottom wall of the base and are arranged in a given spaced relation.

A machine for performing what is termed, the staking-in operation, is shown more clearly in copending application Serial No. 362,110, filed May 10, 1929 and assigned to the assignee of the present invention. In the said copending application, a conveyor is provided which carries a base progressively in operative relation to mechanisms which automatically secure the pins in the base wall. During the operation of securing or staking the pins to the base wall the pins are disposed in apertures or sockets in a conveyor. The conveyor then moves the staked-in bases to position for ejection.

Inasmuch as the pins of the base extend into sockets the operation of automatically discharging bases presents certain difficulties.

It is an object of the present invention therefore to provide mechanism of simple and effective form for automatically ejecting bases from a conveyor.

Another object of the invention is to provide mechanism including cold operating machine elements capable of moving the bases to withdraw the pins from the sockets and to eject the bases from a conveyor.

Other objects and advantages of the invention will be more full understood from the following description together with the accompanying drawing, in which Fig. 1 is a side elevational view showing a portion of a conveyor and mechanism for removing a base therefrom.

Fig. 2 is a fragmentary view of a portion of the mechanism shown in Fig. 1 and illustrating an impact arm for projecting a base from the machine.

Fig. 3 is a fragmentary view similar to Fig. 1 but showing a base lifted from a conveyor, and Fig. 4 is a fragmentary view showing the impact arm in operation to eject the base.

A practical embodiment of the invention may comprise ejector mechanism indicated as a whole the reference numeral 10 disposed adjacent to the path of movement of a conveyor 11. The conveyor may be of the usual disk or circular form and provided with cavities or sockets 12 in which pins 13 of the bases 14 are disposed. The mechanism for disposing the bases on the conveyor and for securing the pins 13 therein is not shown in the present drawing, but the same is fully illustrated in the above mentioned copending application.

For the purpose of the present invention, however, it is only necessary to show means for supporting a base in position for ejection.

As illustrated the pins 13 are provided with shoulders 15 and a seat 16 is provided so that when the pins are disposed in the sockets 12 the shoulders of the pins will rest upon the seat 16, thus slightly elevating the base above the upper surface 17 of the conveyor.

The bases as thus positioned are carried by the conveyor to position adjacent to the ejector mechanism 10. This mechanism may comprise a lifter rod 18 reciprocable vertically in a guide bearing 19. A lower end 21 of the rod is provided with a roller or cam follower 22 disposed in a cam slot 23 of a cam 24 secured to a shaft 25. The shaft 25 is journaled in a bearing 26 and may be rotated by suitable connection with other driven parts of the machine or by an individual motor, not shown. The upper end 27 of the lifter rod is provided with a bracket 28. Mounted to the bracket is a lifter or stripper element 29. This element is of substantially inverted U shaped form and is provided with fingers 31 and 32 so arranged that when the lifter rod 18 is in its lower position the said fingers will be arranged to pass beneath the lower edge or bottom of the base when the conveyor 11 moves a base to position adjacent to the ejector mechanism 10.

When the fingers are positioned beneath the base the cam 24 operates to raise the lifter rod 18 and as shown in Fig. 3, the base 14 will be raised so that the pins 13 clear the cavities or sockets in the conveyor. After the base has been lifted or removed from the conveyor it is necessary to provide means for projecting or discharging it from the fingers 31 and 32. For this purpose an impact arm 33 is provided. The impact arm or ejector member 33 is secured to a shaft 34 journaled in a bearing 35 integral with the bracket 28.

One end of the shaft 34 is provided with an arm 36 connected to one end of a spring 37, the opposite end of the said spring being secured to a pin 38 extending from one side of the lifter or stripper element 29.

Means to be presently described operate to rotate the shaft 34 so as to expand the spring 37 and a contraction of the spring causes an oscillatory movement of the impact arm 33 which is so proportioned that an end 39 thereof will engage the base 14 and propel it from its position on the fingers 31 and 32 and into a suitable guide or chute 41.

For the purpose of expanding the spring 37 to store potential energy for actuating the arm 33 the shaft 34 is provided with a cam 42 and a trigger 43. The trigger 43 is normally urged by means of a spring 44 into engagement with the periphery of the cam 42. The cam 42 is provided with a notch 45 which engages the trigger 43 thus holding the spring 37 expanded and the impact member 33 ready to operate.

A movement of the cam 42 and consequently the shaft 34, is accomplished by the provision of an arm 46 secured to the shaft 34 which is engaged by a pin 47 extending from a stationary post 48 secured to the guide bearing 19. When the cam actuates to raise the lifter rod 18 the pin 47 engages the arm 46 and the trigger 43 snaps into position behind the notch 45. As the cam 24 continues to operate and the lifter rod continues to move upwardly a short pin or lug 49 projecting from the post 48 engages an end 51 of the trigger thus releasing it from engagement with the notch 45 and permitting the spring 37 to actuate the impact member 33 and discharge a base from the lifter element 29. When the impact member is actuated the ejector mechanism 10 is in its upper position and a stop 30 is provided to engage the trigger 43 and thus limit the return or effective movement of the impact member 33.

The above described mechanism for ejecting bases operates upon each movement of a base to position adjacent to the said ejector mechanism. Assuming that a base is in position and the lifter fingers 31 and 32 are disposed thereunder a movement of the lifter rod upwardly causes the pin 47 to engage with the arm 46 rotating the shaft 34 thereby moving the impact member 33 upwardly and at the same time expanding the spring 37.

When the impact member 33 has reached its upper position ready for operation, the pin 47 will by reason of its engagement with the arm 46, have moved the cam 42 so that the notch 45 thereof will be in position to receive the trigger 43. When the trigger is in position the impact arm 33 will be held inoperative and at this time the upward movement of the lifter arm will have raised the base by reason of the lifter element 29 to an elevated position so that the pins 13 clear the conveyor.

A continued operation of the cam 24 then causes the lifter rod to descend. As the lifter rod 18 moves upwardly the impact member 33 will reach its upper or operative position prior to the time when the pins 13 clear the aperture in the conveyor. A continued upward movement of the lifter rod will cause the pin 49 to engage the trigger 43 at which time the pins 13 will have cleared the conveyor and the impact member will thus be released and the base discharged from the machine.

The present ejector mechanism may be employed for the discharge of bases or similar articles and although a preferred embodiment of the invention is shown and described herein it is to be understood that modifications may be made therein without departing from the spirit and scope of the invention as set forth in the appended claims.

What is claimed is:

1. A discharge device for bases having contact pins comprising a support having apertures to receive contact pins, means for lifting a base to clear the contact pins of said apertures, and means for removing a base from said first mentioned means.

2. A discharge device for bases having contact pins comprising a support having apertures to receive the contact pins, means for lifting a base to clear the contact pins of said apertures, an oscillatory member, and means for actuating said member to engage and discharge the lifted base.

3. A device of the class described comprising a support for an article, a lifter means for raising said article above said support, an ejector member carried by said lifter means, means for storing potential energy during a movement of said lifter means, and means for releasing said energy to actuate said ejector member.

In testimony whereof, I have hereunto subscribed my name this 1st day of August 1929.

PETER MEYER.